United States Patent
Derse

(10) Patent No.: US 8,595,934 B2
(45) Date of Patent: Dec. 3, 2013

(54) METHOD OF PRODUCING A COMPOSITE BODY

(75) Inventor: Matthias Derse, Elzach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 122 days.

(21) Appl. No.: 13/246,385

(22) Filed: Sep. 27, 2011

(65) Prior Publication Data

US 2012/0011698 A1    Jan. 19, 2012

Related U.S. Application Data

(60) Division of application No. 12/580,520, filed on Oct. 16, 2009, now abandoned, which is a continuation of application No. PCT/DE2008/000632, filed on Apr. 16, 2008.

(30) Foreign Application Priority Data

Apr. 18, 2007   (DE) .......................... 10 2007 018 563

(51) Int. Cl.
*B21K 1/30*    (2006.01)

(52) U.S. Cl.
USPC ........ 29/893.37; 29/893; 29/893.1; 29/893.2; 188/378; 464/89; 464/91

(58) Field of Classification Search
USPC ........... 29/893, 893.1, 893.2–893.37; 464/89, 464/91; 188/378
See application file for complete search history.

(56) References Cited

U.S. PATENT DOCUMENTS

| | | | |
|---|---|---|---|
| 288,134 A | 11/1883 | Stone, Jr. | |
| 820,789 A | 5/1906 | Hutchins | |
| 1,775,556 A * | 9/1930 | Hewel | 464/91 |
| 1,928,763 A | 10/1933 | Rosenberg | |
| 2,269,799 A * | 1/1942 | Upson | 464/89 |
| 3,385,127 A | 5/1968 | Naruse et al. | |
| 4,078,445 A | 3/1978 | Kiser, Jr. | |
| 5,722,295 A | 3/1998 | Sakai et al. | |
| 2002/0043438 A1 * | 4/2002 | Nakanishi | 188/378 |
| 2003/0024345 A1 | 2/2003 | Hodjat et al. | |

FOREIGN PATENT DOCUMENTS

| | | |
|---|---|---|
| DE | 26 28 826 | 2/1978 |
| DE | 44 08 427 A1 | 10/1995 |
| DE | 195 33 446 A1 | 3/1997 |
| EP | 0 793 031 A | 9/1997 |
| EP | 0 907 039 A | 4/1999 |
| EP | 1 225 329 A | 7/2002 |
| GB | 243 518 A | 12/1925 |
| JP | 56 080556 A | 7/1981 |
| WO | WO 02/08633 A | 1/2002 |

OTHER PUBLICATIONS

International Search Report dated Aug. 22, 2008 with English translation of relevant portion.

* cited by examiner

*Primary Examiner* — Richard Chang
(74) *Attorney, Agent, or Firm* — Crowell & Moring LLP

(57) ABSTRACT

A method of producing a composite body, such as a gear wheel or torsional vibration damper, including a radially inner hub body provided with outer profiles, a surrounding outer body provided with inner profiles, and an intermediate layer of synthetic resin material which connects the outer profiles of the hub body with the inner profiles of the outer body; the hub body being with an inner contour adapted to mount the composite body on a shaft.

1 Claim, 1 Drawing Sheet

METHOD OF PRODUCING A COMPOSITE BODY

CROSS REFERENCE TO RELATED APPLICATIONS

This application is division of co-pending application Ser. No. 12/580,520, filed Oct. 16, 2009, which in turn was a continuation of international patent application no. PCT/DE2008/000632, filed Apr. 16, 2008 designating the United States of America, and published in German on Oct. 30, 2008 as WO 2008/128513, the entire disclosure of which is incorporated herein by reference. Priority is claimed based on Federal Republic of Germany patent application no. DE 10 2007 018 563.6, filed Apr. 18, 2007.

BACKGROUND OF THE INVENTION

The present invention relates to a composite body comprising a hub, an outer ring, and a synthetic resin material interposed between the hub and the outer ring. Devices of this general type are disclosed, for example, in published German patent application no. DE 26 28 826 or in United Kingdom patent specification no. GB 243,518.

In DE 26 28 826, the composite body, which is constructed as a torque-transmitting gear wheel, comprises a radially inner hub body, which is provided with external profiles and can be placed with the aid of an inner recess thereof on a shaft and an outer body, which is provided at a radial distance from the hub body, in the form of a gear rim comprising internal profiles, and an intermediate layer provided between the internal and external profiles, and an insulating layer which is intended to perform a damping function and represent an electrical insulation. The inner and outer bodies are fitted on the insulating layer provided between them.

In GB 243,518, the outer part is likewise a gear rim comprising outwardly oriented teeth and inwardly oriented projections. The inner hub body is a flange-like body with axial holes. The synthetic material inserted between the two parts connects the two parts, whereby an interlocking engagement is produced by way of the holes provided in the flange of the inner part in addition to the existing adhesive force in order to transmit torque from or to the hub body. The torque is likewise transmitted from or to the gear rim initially by way of the adhesive force and additionally by interlocking engagement by way of the radially inwardly oriented regions of the gear rim and the plastic regions located therebetween.

The devices disclosed in both the published German patent application and the United Kingdom patent specification suffer from the disadvantage of high production cost, particularly due to the necessary forming and machining operations of the metal parts. In the case of the devices disclosed in the United Kingdom patent specification, the steel hub 3 must be flanged in order to receive the edge 6, and the edge 6 must be knurled elaborately in order to ensure very good contact with the molded compound 4. The holes 7 must either be punched or drilled.

The sharp-edged profiles known from the published German patent application can be produced only by machining operations, e.g., by broaching.

Another disadvantage of the devices disclosed in the United Kingdom patent specification is that the plastic plugs extending through the openings in the flange enable only a relatively small torque transmission because the torque transmitting surface is relatively small. Furthermore, the plugs extending axially through the flange may be sheared off in the case of sudden applications of torque forces.

Teeth, such as those depicted in the published German patent application, are more advantageous in this respect; however, they necessitate higher production costs, as mentioned above.

SUMMARY OF THE INVENTION

Therefore, it was an object of the present invention to provide an improved composite body of the type described above.

Another object of the invention was to provide a composite body which can be produced more economically, both in terms of the materials used and the steps required for its production.

A further object of the invention was to provide a composite body which is capable of transmitting high torque values.

These and other objects are achieved in accordance with the present invention by providing a composite body as described and claimed hereinafter.

In accordance with the present invention, the composite body, which may be a gear wheel or a vibration damper or the like, may comprise:
- a radially inner hub body, which is provided with external profiles and can be mounted on a shaft with the aid of an inner recess thereof,
- an outer body, which is provided spaced a radial distance from the hub body and which comprises internal profiles, and
- an intermediate layer, which is provided between the internal and external profiles in order to connect them, and which can be introduced between the two parts, whereby the hub body and/or the outer body are parts produced by massive forming.

In many cases, it can be advantageous if at least one of these parts—the outer body or the hub body—is a part made of steel, in particular a massive-formed part such as a forged steel part. Such parts can be produced easily and economically. Furthermore, it is advantageous that the molded external and/or internal profiles do not need to be shaped by expensive machining operations. An additional advantage is that the surface area is further increased due to the roughness so that an improved adhesion of the synthetic resin material, which may be a thermoplastic resin introduced, e.g., injected, between the outer body and the hub body, is achieved.

In a vast majority of cases, it is sufficient if the surfaces of the internal and/or external profiles are treated with a cleaning process after the forming process, which cleaning process can also include at least one blasting step, e.g., sandblasting or shot blasting or the like.

The surface portion for producing the connection between the surfaces of the internal and/or external profiles can be increased even further by constructing at least one of the profiles in sinusoidal form or in a sinusoidal-like manner. The profiles can also be constructed in such a way that they overlap each other radially.

One advantageous possibility for producing such a composite body, particularly if the component is used for a gear wheel, is to finish-machine the outer body and to finish-machine the outer teeth, for example, by honing, grinding, scraping or the like after an optional tempering process and before the connection to the inner body, that is e.g., before the vulcanization of both parts. Furthermore, it can be advantageous if the inner body is also finish-machined and particularly the previously tempered inner contour is precision-machined or finish-machined before the connection of the outer body and the hub body, whereby it is possible for the inner contour to be a smooth bore or to comprise teeth.

Furthermore, the composite body can be produced advantageously by finish-machining, e.g., precision-machining the inner contour of the inner part and/or the outer contour of the outer part only after the connection of the inner and outer part by the intermediate layer. Such a method or such a process makes it possible to produce the inner and outer part separately and also interconnect the two parts without extremely high requirements of accuracy, existing tolerances being compensated by the machining operations carried out after the connection, e.g., after the vulcanization of the two parts.

BRIEF DESCRIPTION OF THE DRAWINGS

The invention will be described in further detail with reference to illustrative preferred embodiments shown in the accompanying drawing figures, in which.

DETAILED DESCRIPTION OF PREFERRED EMBODIMENTS

Figure 1:
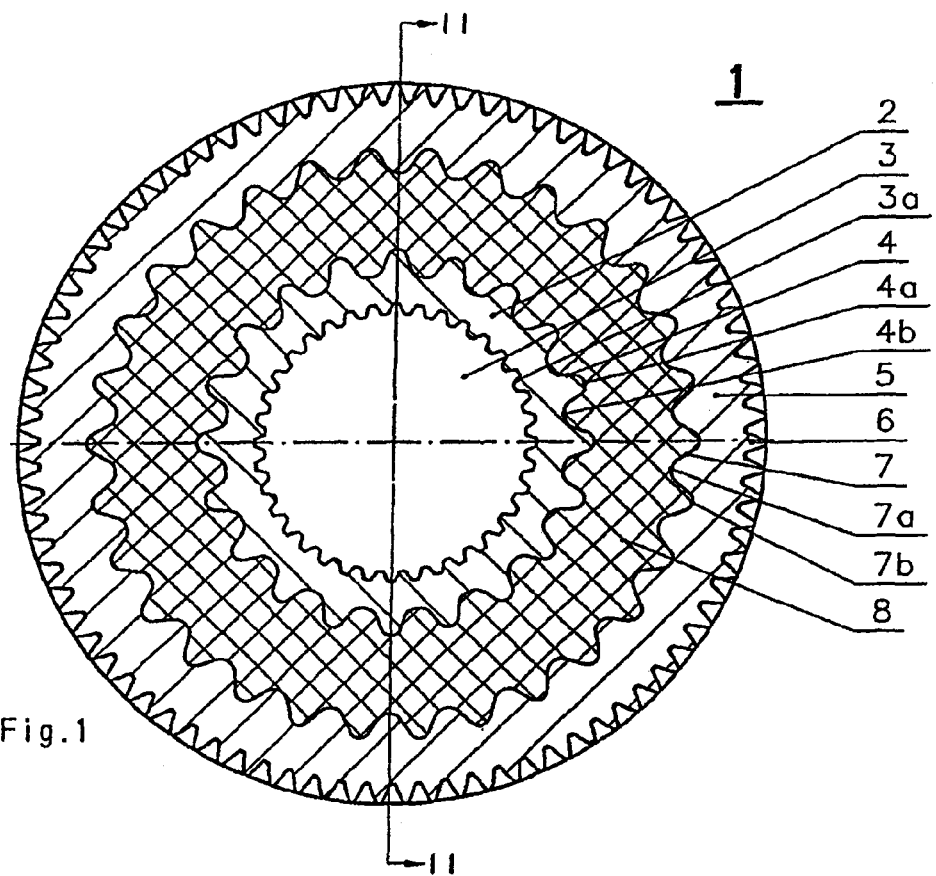
FIG. 1 is a plan view of a composite body according to the invention in the form of a gear wheel 1.
Figure 2:
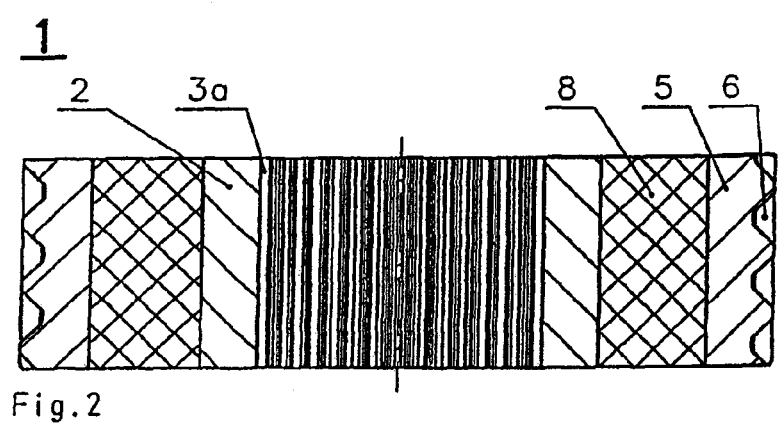
FIG. 2 is a sectional view taken along the line II-II of FIG. 1.
Figure 3:
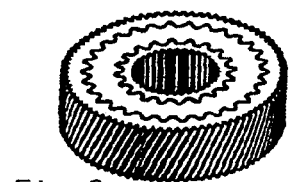
FIG. 3 is a reduced perspective view of a composite gear wheel according to the invention.

The gear wheel 1 comprises a hub body 2 having an inner recess 3 and a profile 4 on its outer circumference. The profile is formed of wave crests 4a and wave troughs 4b.

The outer body 5 surrounds the hub 2 spaced a radial distance from the hub body 2. This outer body is provided with a tooth profile 6 on the radial exterior thereof and with an internal profile 7 comprised of wave crests 7a and wave troughs 7b formed on the radial interior thereof.

Both profile 4 and profile 7 are shaped in a sinusoidal or sinusoidal-like manner. Between the profiles 4 and 7, at least one elastic sound-insulating and/or vibration-insulating intermediate layer 8 is provided, which is injected, cast-in-place or vulcanized. This intermediate layer 8 can also be applied by being vulcanized, glued or the like to only one of the parts 2, 5, or it may be a separately produced body on or into which both the respective inner and outer parts are fitted or inserted and which is connected by being glued, fused or the like with at least one of the parts.

In the present illustrative embodiment the hub part 2 and the outer part 5 are formed as forgings, and one or both the profiles 4, 7 may have at least approximately the structure obtained during the forging process. In this case they are not machined; however, before being joined with the intermediate layer 8 or the introduction of the intermediate layer 8 between them, they may advantageously be cleaned, e.g., chemically and/or by blasting.

Before the connection of the hub 2 and/or the outer body 5 or the insertion of the intermediate layer 8, the hub body 2 can be finish-machined, that is to say, the optionally previously tempered round inner contour of the recess 3 is, for example, ground, hard-turned, honed or the like.

The inner contour can also be provided with a tooth profile 3a, which is finish-machined after at least this tooth profile 3a of the hub part 2 has been tempered beforehand and before assembly with the intermediate layer and/or the outer part, as described above.

The inner contour, which is round or provided with a tooth profile, can also be untempered and machined as described above.

Likewise, the teeth 6 of the outer part 5 can be finish-machined before the insertion or vulcanization of the intermediate layer 8 or before the application of the outer part 5; that is to say, before the connection of the profile 7 with the intermediate layer 8, for example, before the gluing of the profile to the intermediate layer applied previously to the hub body 2.

It can also be advantageous to finish-machine the inner contour 3 and/or the teeth 6 after the hub 2 and the outer body 5 are interconnected by the intermediate layer 8.

It is evident that the production costs of such composite bodies can be reduced considerably by producing the hub 2 and/or the outer part 5 as forgings and by dispensing with any chip-forming machining operations of the profiles 4 and 7. The relatively large surfaces, namely the at least approximately sinusoidal shape of the profiles 4 and 7 and the relatively rough forged structure of these surfaces that is essentially maintained can considerably improve the adhesive forces between these surfaces and the intermediate body and thus also the torque transmission, durability and service life of the composite body. The shear risk is practically eliminated by the gentle roundings of the sinusoidally-shaped profiles.

Based on their accompanying advantages, composite bodies constructed in this manner are particularly suitable for use in motor vehicles as torque-transmitting fixed gears or idler gears.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A method for producing a gear wheel, said method comprising:
   providing a radially inner hub body having external profiles formed with wave crests and wave troughs thereon and an inner recess for mounting said radially inner hub body on a shaft,
   providing an outer body having internal profiles formed with wave crests and wave troughs thereon and disposing said outer body surrounding said radially inner hub body, and
   providing an intermediate layer comprising a synthetic resin between and connecting said radially inner hub body and said outer body,
   wherein at least one of said radially inner hub body and said outer body is a forged steel part,
   wherein at least one of said external profiles of said radially inner hub body and said internal profiles of said outer body are produced having intermediate layer adhesion-enhancing rough surface areas, and
   wherein a tooth profile on a radial exterior of said outer body is finished by at least one of honing and grinding after connecting said radially inner hub body to said outer body.

* * * * *